United States Patent [19]
Kubasko

[11] Patent Number: 5,384,448
[45] Date of Patent: Jan. 24, 1995

[54] THERMALLY STABLE SOLENOID UTILIZING WOUND ELECTRIC HEATING WIRE

[76] Inventor: James J. Kubasko, R.R. #3, Box 395-B, Lake Ariel, Pa. 18436

[21] Appl. No.: 853,596

[22] Filed: Mar. 18, 1992

[51] Int. Cl.6 ............................................. H05B 1/00
[52] U.S. Cl. ..................................... 219/209; 336/55; 336/179; 73/497
[58] Field of Search ..................... 219/209, 511, 519; 336/55, 61, 62, 179, 220, 177; 338/62, 63, 299; 73/497, 510, 510 A, 517 B

[56] References Cited

U.S. PATENT DOCUMENTS

| | | | |
|---|---|---|---|
| 783,532 | 2/1905 | Moody | 219/209 |
| 1,972,112 | 9/1934 | Rypinski | 336/55 |
| 2,082,121 | 6/1937 | Rypinski | 336/55 |
| 2,140,553 | 12/1938 | Rypinski | 336/55 |
| 2,287,295 | 6/1942 | Cox et al. | 219/209 |
| 2,338,518 | 1/1944 | Koch | 219/511 |
| 3,402,280 | 9/1968 | Grigg | 219/209 |
| 3,818,323 | 6/1974 | Dowling et al. | 336/57 |
| 4,551,681 | 11/1985 | Seeley | 336/55 |
| 4,711,125 | 12/1987 | Morrison | 73/510 |

Primary Examiner—Bruce A. Reynolds
Assistant Examiner—John A. Jeffery
Attorney, Agent, or Firm—Benman, Collins & Sawyer

[57] ABSTRACT

A thermally stable solenoid including a heater coil and an inductive coil wound around the same axis. The current in the heater coil is controlled by the current in the inductive coil through a control circuit. The heater coil is energized in such a way as to ensure that the heat generated by both coils is constant throughout the required range of operation.

3 Claims, 16 Drawing Sheets

THERMALLY STABLE SOLENOID UTILIZING WOUND ELECTRIC HEATING WIRE

BACKGROUND OF THE INVENTION

1. Field of the Invention

The present invention relates to inertial measurement units. More specifically, the present invention relates to techniques for compensating for heat in inertial measurement units and other instruments.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

U.S. Pat. No. 4,711,125, issued Dec. 8, 1987, to Melvin M. Morrison and entitled "Inertial Measurement Unit" (the teachings of which are incorporated herein by reference) describes an inertial measurement unit which provides three axis acceleration and angular turning rate detection with a cubical magnetically suspended sensor mass disposed within a cubical outer assembly. The sensor mass is free to move mechanically independent from the outer assembly. The sensor mass has a plurality of sensing and suspension elements of particular orientation on a selected plane for each axis of detection which face a corresponding set of sensing and suspension elements respectively on interior surfaces of said outer assembly. The sensing elements are advantageously cross-coupled to minimize cross-axis sensitivity. The device utilizes several servo-control loops of conventional design to process outputs from the pickoffs and maintain the sensor mass in proper orientation.

The above-described inertial measurement unit (the "Cube"), with all of its advantages over existing conventional IMU's, has an inherent limitation with which could impact its accuracy and cost advantages. Since the Cube is a single instrument with six outputs, it is difficult to isolate the heating effects of the coils between channels.

The Cube contains 18 heat generating coils oriented symmetrically about the inside faces of the six outer plates with three coils on each plate. Each of the coils act as part of a force rebalance subsystem against corresponding fixed magnets on the sensor mass. When the sensor mass is displaced due to an accelerative force, an increase in direct current in the corresponding coil forces the sensor mass back to the null position. This increase in current causes an increase in the heat generated by that coil. This heat is transferred to the surrounding plate in which it is mounted through conduction, and to the sensor mass through radiation, convection and/or conduction.

The heat transfer causes a thermal gradient through the entire structure from the heat source (the coil) to the heat sink which is generally the outside structure of the Cube. The subsequent temperature increase causes the materials used to construct the outer plates and the sensor mass to expand. This expansion has the effect of changing the pick-off scale factor in that channel as heat slowly propagates throughout the structure. This effect is compounded by the fact that the pickoffs in all other channels are effected by the thermal gradients and subsequent expansion even though there are no accelerations in their respective channels. An output will be produced in every channel because of the heating effect and must be countered in some way. Furthermore, the thermal gradients are very dynamic during typical operation when the linear and angular accelerations shift from channel to channel making it very difficult to separate channel outputs due to heating from those caused by acceleration.

Conventional IMU's control intra-channel thermal effects by converting the DC output signal from analog to digital and compensating for the effects through software. This technique is very effective in conventional IMU's because the individual channels are isolated from each other. The thermal effects of one channel do not effect any other channel because the IMU consists of individual instruments which are physically separated from each other. This is not the case in the Cube since all channels are contained in the same instrument.

With 18 variable heat sources for the Cube, the thermal gradients are generally very dynamic and slow in response to the inputs. The number of combinations of overlapping thermal gradients across each of the 36 pickoffs are nearly unlimited. If the conventional approach is undertaken with respect to the Cube, i.e., compensation through software, the designer is faced with a tradeoff between the number of thermal gradient response scenarios and the response time of the computer, that is, the number of times per second the computer can respond to an acceleration input. Thus, modeling only a few basic scenarios will cause a loss in accuracy due to the pick-off scale factor changes which are not modeled. And a modeling of every scenario require a considerable amount of computer software and so many calculations that the response time of the Cube would be slowed considerably. Further, the development cost and time required to test the scenarios and write the software add to the overall cost of the system, not to mention the opportunity cost of a delayed entry into the market.

The system can be improved somewhat by adding heaters to the Cube so that it operates at a relatively high temperature. This causes the thermal gradients to be less severe. However, the heaters and the temperature sensor require an independent circuit, add cost to the system, do not eliminate the digital scale factor adjustments add to the number of adjustments to be compensated for.

What is needed is a thermally stable Cube design which would emit the same amount of heat regardless of the current drawn for forced rebalance of the sensor mass. If the heat generated by all 18 coils in the Cube is always the same, the thermal gradients in the structure will reach static conditions after a warm-up period. The structure supporting the pickoffs, as well as the pickoffs themselves, would expand to a static displacement position and thereafter operate at constant geometry. This would insure that there are no changes to the scale factor due to variable heating of the coils so an output in any channel will be purely from acceleration.

Furthermore, the exchange of radiant energy between the inside surface of the outer plates and the outside surface of the sensor mass would have a reciprocity relationship and would therefore be in thermal equilibrium. This would insure that the magnetic field strength of the fixed magnets do not vary due to temperature effects. Further, this would eliminate the need for complicated software to compensate for such scale factor changes and allow the Cube to run at maximum speed.

Thus, there is a need in the art for further improvements in the design of inertial measurement units. Specifically, there is a need for a thermally stable Cube design which would emit the same amount of heat regardless of the current needed for forced rebalance of the sensor mass.

SUMMARY OF THE INVENTION

The present invention addresses the need in the art by providing a thermally stable solenoid. The invention includes a heater coil and an inductive coil wound around the same axis. The current in the heater coil is controlled by the current in the inductive coil through a control circuit. The heater coil is energized in such a way as to ensure that the heat generated by both coils is constant throughout the required range of operation.

DESCRIPTION OF THE INVENTION

Figure 1:
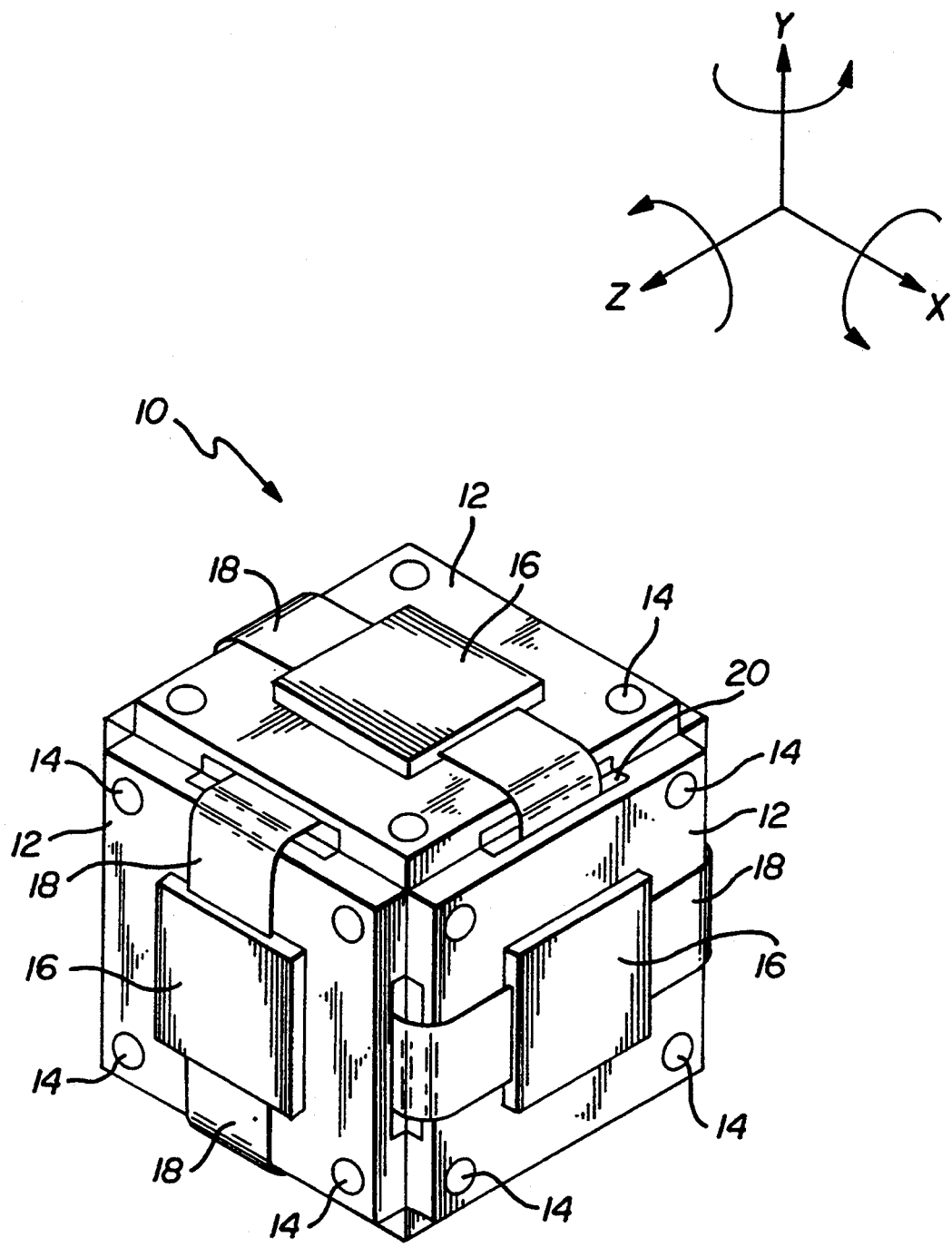
FIG. 1 is a perspective view of an illustrative embodiment of the Cube of conventional design.

As disclosed in the above-referenced Morrison patent, the Cube of conventional design provides a magnetically suspended combination three axis accelerometer and three axis angular turning rate detector. The advantageous features of the Cube of conventional design are made possible by the use of a sensor mass and suspension assembly of unique and novel design. An illustrative embodiment of the Cube is shown fully shielded in FIG. 1. The Cube 10 is shown with cover plates 12 which serve as electromagnetic shields. As discussed more fully below, the Cube consists of an outer assembly 30 and an inner assembly (sensor mass) 50. The cover plates 12 are made of metal or other suitable material. The plates are secured to the Cube by screws or rivets 14. Electronic circuitry (hybrids) is housed in packages 16 which are mounted on cover plates 12. Electrical signals are brought out of the Cube by ribbon connectors or flex tapes 18 to the packages 16 through openings 20.

Figure 2:
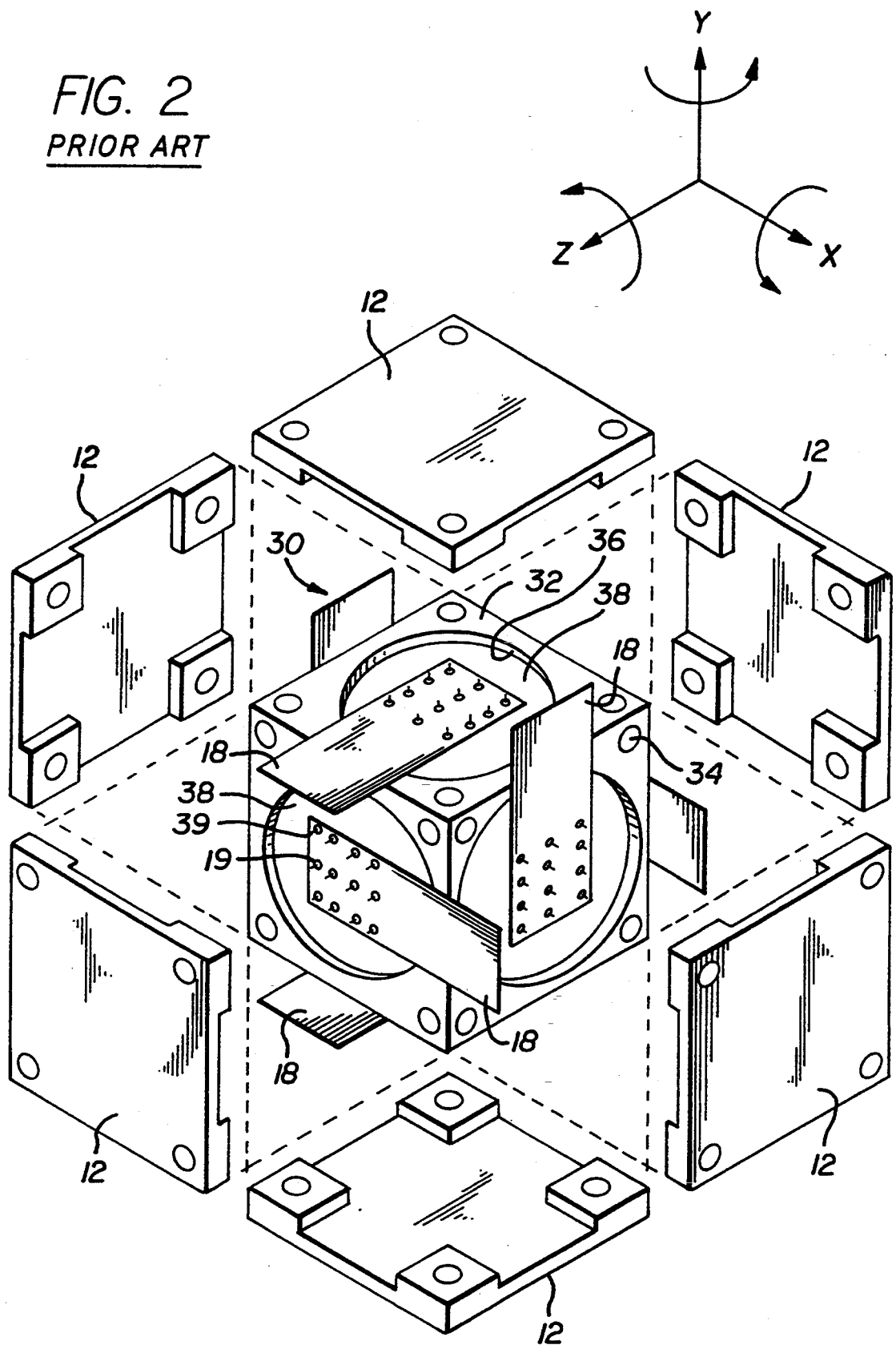
FIG. 2 is a partially exploded perspective view of the Cube of conventional design.

Removal of the packages 16 and disassembly of the cover plates shows in FIG. 2 the outer assembly 30 of the Cube with ribbon connectors or flex tapes 18 in place. The outer assembly 30 consists of an outer cube 32 of ceramic, metal or other suitably rigid lightweight material. The outer cube 32 is hollow and has a plurality of holes 34 by which the cover plates 12 are secured to the Cube. Through bores 36 outer plate assemblies 38 are secured to the outer cube 32. Six outer plate assemblies are provided, one on each side of the cube 32.

A plurality of pins 39 extend from the rear of the outer plate assemblies 38. The pins 39 engage the flex tapes 18 at terminals 19. As shown more clearly in FIG. 3, the pins 39 are attached to contacts 40 and coils 42. The pins 39a, 39b and 39c are connected to pins 40a, 40b, and 40c and so on respectively. Note that two pins g and h or i and j etc. are required for each coil 42gh, 42ij, etc.. Each of the six sides of the Cube has an outer plate assembly 38 with a set of pins 39. Each side of the Cube is numbered 1–6 so that electrical signals coming from a particular pin of a particular plate are associated with a particular movement. Thus signals on pin 'a' of a plate 38 on side '2' would be labeled as 39a2, signals on pin 'e' of the same plate would be 39e2, the same pin on a plate 38 on side 3 would be 39e3, a coil on the same plate would be addressed as 39gh3 etc.

Figure 4:
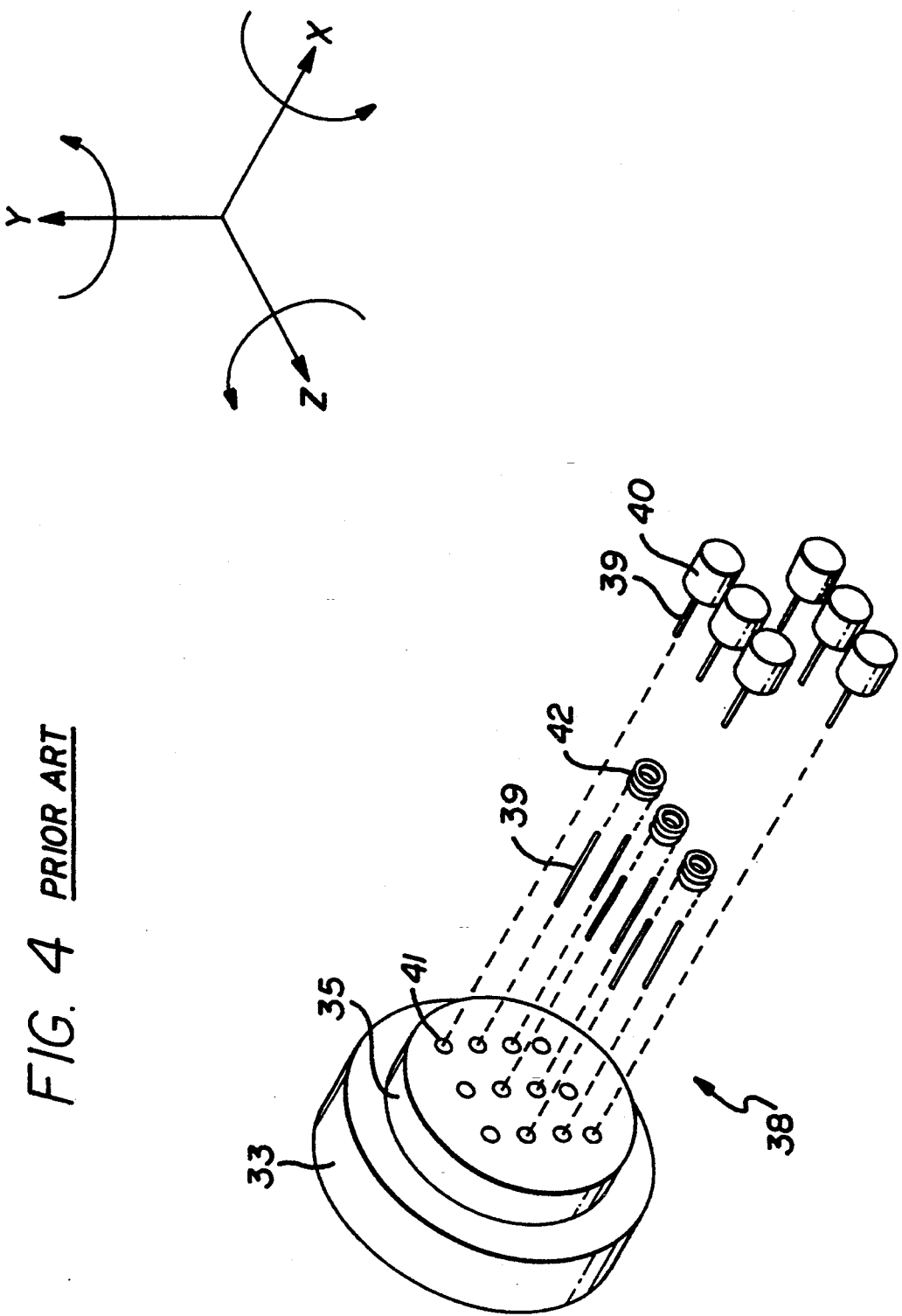
FIG. 4 is an exploded perspective view of the disassembled outer plate assembly.

The outer plates 38 are identical. The plate 38 is shown in disassembled relation in FIG. 4. The plate 38 has a major periphery 33 and a minor periphery 35. The plate 38 is constructed of ceramic or other suitable material. The plates 38 are bonded to the outer cube 32 to provide a hermetic seal. Each plate 38 has a plurality of openings 41 through which the pins 39 extend. The pins 39 are part of the metal contacts 40 and similar pins 39 are connected to the coils 42. The number of turns of the coil is a design variable to be determined by analysis to meet design specifications in a conventional manner.

Figure 3:
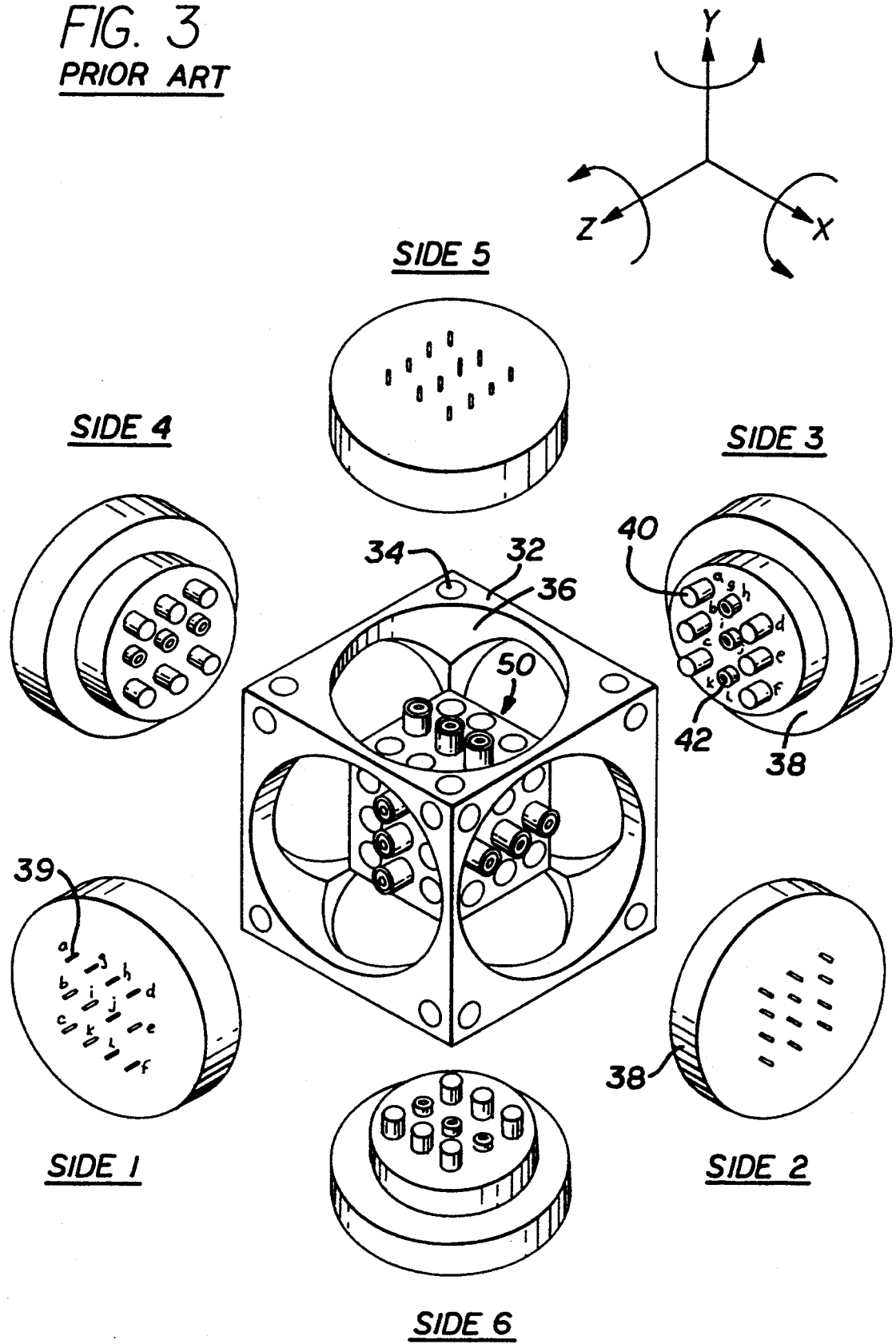
FIG. 3 is a further exploded perspective view of the Cube of conventional design.

As shown in FIG. 3, the outer assembly provides three sets of suspension elements and three sets of sensing elements. Each set is formed by the coils 42 and contacts 40 on two plates 38 on opposing sides which are mounted in face-to-face relation on the outer cube 32. Thus, the plates on sides 1 and 3 form a first set, plates on sides 2 and 4 form a second set and sides 5 and 6 form a third set. On each plate are three coils 42 arranged in a line to form a linear array of suspension elements. The linear array of suspension elements or coils 42 on each plate are aligned with the other plate in the set, and perpendicular to the linear arrays of suspension elements of the other sets. Stated alternatively, each set of suspension elements is disposed in a plane perpendicular to the planes in which the remaining sets are disposed and perpendicular to the corresponding axis of rotation and axis of translation.

Figure 5:
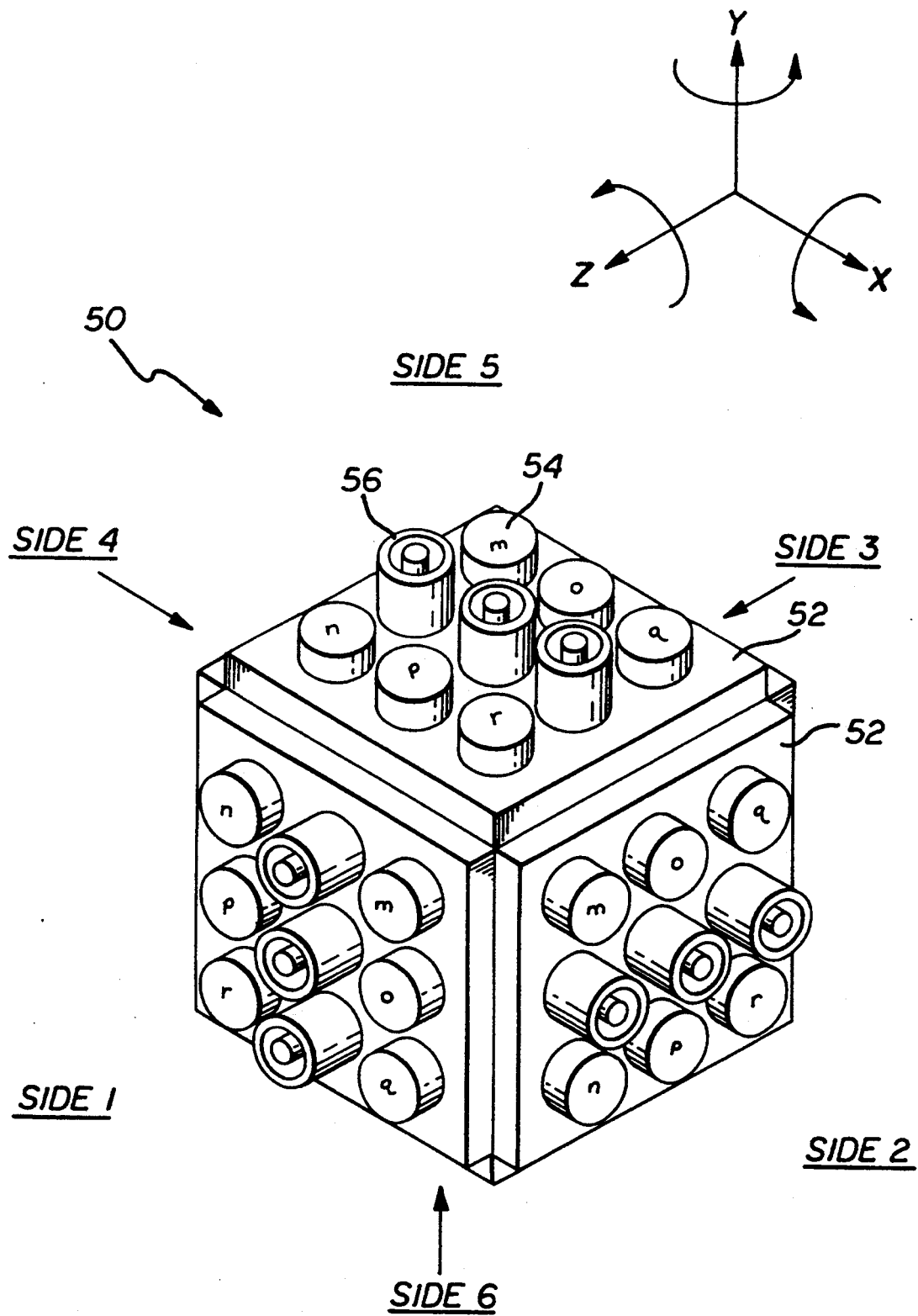
FIG. 5 is a perspective view of the sensor mass of the Cube of conventional design.
Figure 6:
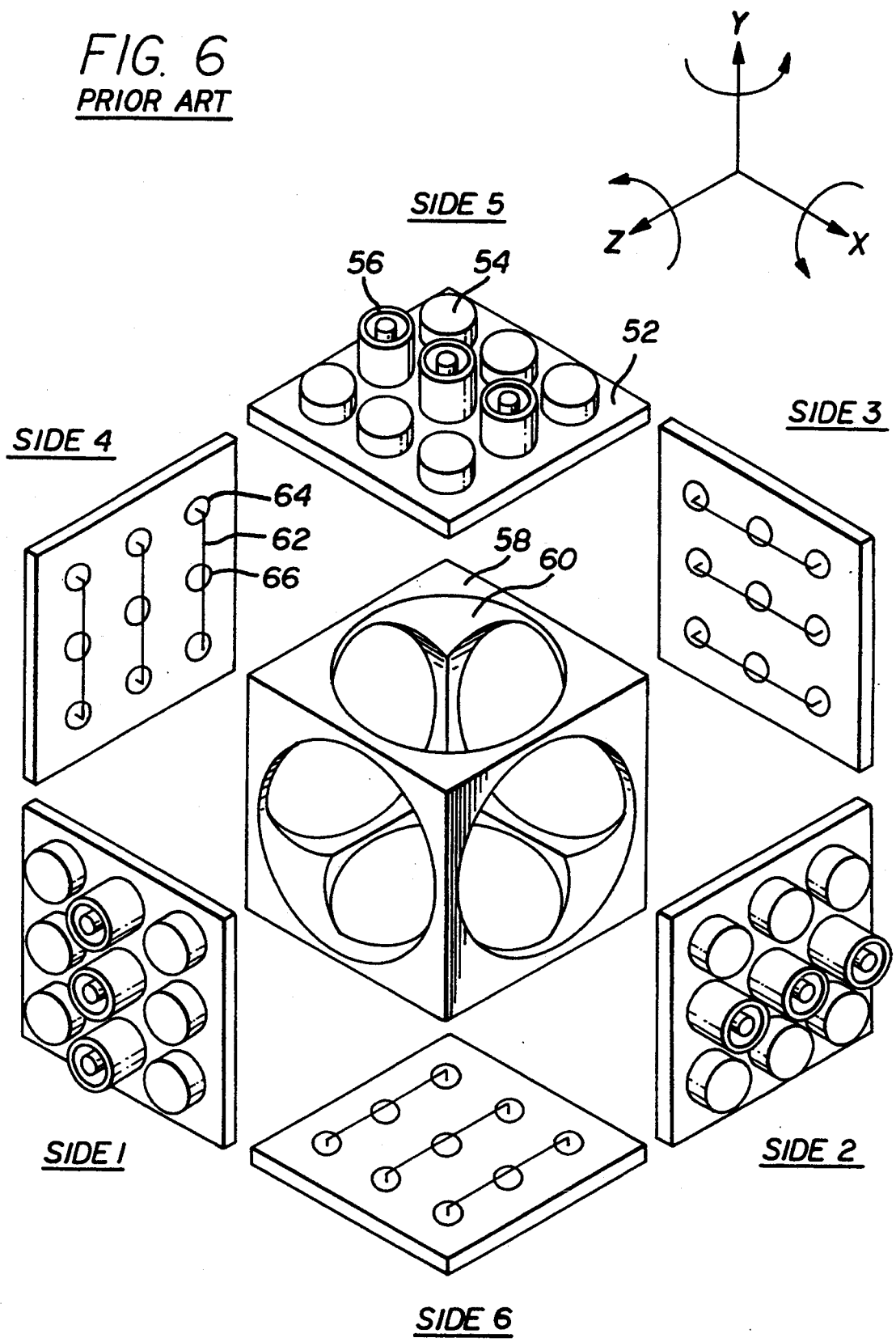
FIG. 6 is an exploded perspective view of the disassembled sensor mass of the Cube of conventional design.

Each outer plate 38 includes two mutually parallel linear arrays of contacts 40 which serve as sensing elements. As shown in FIG. 3, the linear arrays of contacts 40 are mounted on each side of the linear arrays of coils 42. The pairs of linear arrays of contacts 40 are aligned with the pair of linear arrays of contacts 40 on the opposing plate with which it forms a set. Stated alternatively, each set of sensing elements is disposed in a plane perpendicular to the planes in which the remaining sets are disposed and perpendicular to the corresponding axis of rotation and axis of translation. Similarly, the sensor mass 50 is shown in FIGS. 5 and 6 as having three sets of suspension elements and three sets of sensing elements. Each set is formed by the magnetic assemblies 56 and contacts 54 on two opposing plates 52 disposed in back-to-back relation on the inner cube 58. Thus the plates on sides 1 and 3 form a first set, plates on sides 2 and 4 form a second set and plates on sides 5 and 6 form a third set. Each plate in each set includes a set of suspension elements or magnetic assemblies 56 arranged in a linear array. The linear array of suspension elements on each plate are aligned with the corresponding array of suspension elements on the other plate in the set and perpendicular to the arrays of the other sets. Stated alternatively, each set of suspension elements is disposed in a plane perpendicular to the planes in which the remaining sets are disposed and perpendicular to the corresponding axis of rotation and axis of translation.

Each plate in each set also includes a linear array of contacts 54 which serve as sensing elements. The contacts 54 on each plate are arranged in mutually parallel linear arrays. As shown in FIG. 6, the linear arrays of contacts 54 are disposed on either side of the linear array of magnetic assemblies 56. The linear arrays of contacts 56 are aligned with the corresponding arrays on the opposing plate in each set. Stated alternatively, each set of sensing elements is disposed in a plane perpendicular to the planes in which the remaining sets are disposed and perpendicular to the corresponding axis of rotation and axis of translation. Thus the outer assembly 30 and the sensor mass 50 together form a three axis suspension and sensing arrangement by which the sensor mass 50 is suspended within the outer assembly 30 for independent movement in any direction with no mechanical connection thereto.

Figure 7:
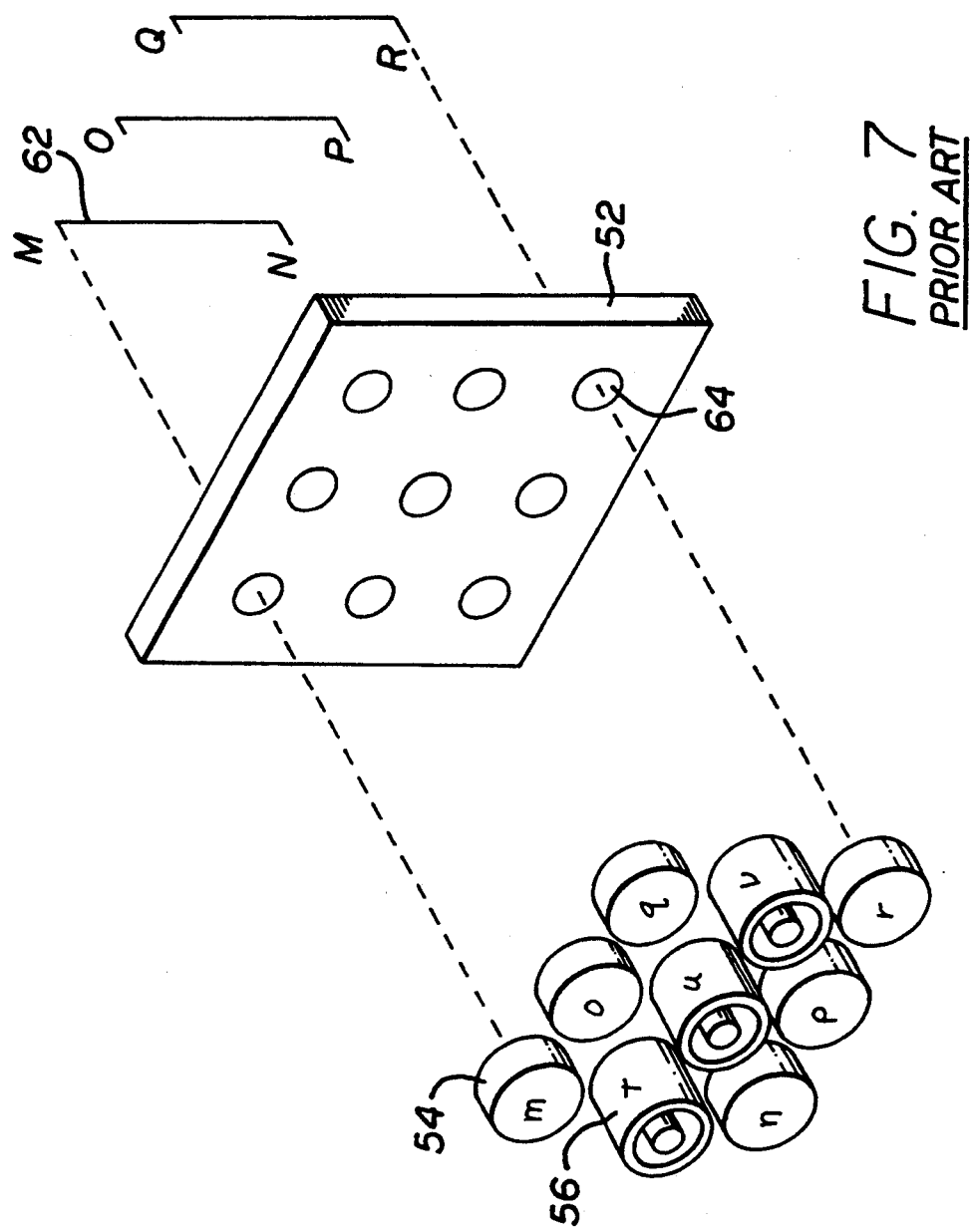
FIG. 7 is an exploded view of the inner plate assembly of the Cube of conventional design.
Figure 8:
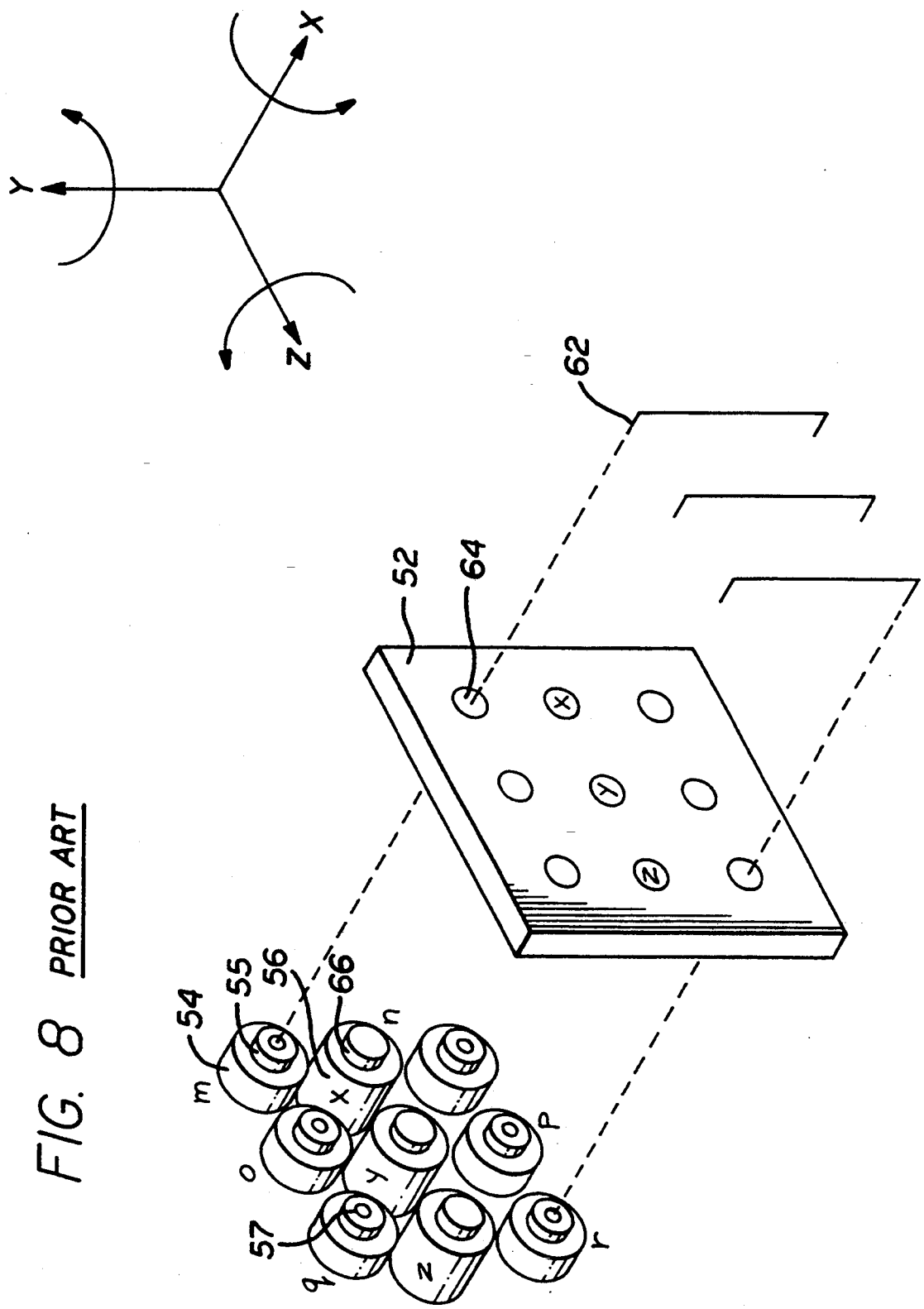
FIG. 8 is a rear exploded view of the inner plate assembly of the Cube of conventional design.

Returning briefly to FIG. 3, the sensor mass 50 is shown within the outer cube 32. The sensor mass 50 is isolated in the assembled perspective view of FIG. 5. It is shown in greater detail in the exploded view of FIG. 6 where the sensor mass assembly 50 is seen to include a structural inner cube 58 of ceramic, metal or other suitably lightweight material. The inner cube 58 has a plurality of bores 60 to reduce weight. An inner plate assembly is affixed to each face of the outer cube 58. The plate 52 is made of ceramic or other suitable material. As shown in FIG. 7, the plate 52 is generally square with a matrix of openings 64 therethrough. Contacts 54 are secured to the plate 52 at the openings 64 with contacts labeled m and n joined by the mn jumper 62. Similarly, the pins labeled o and p are joined by the op jumper 62 and so on. FIG. 8 shows a rear view of the contacts 54 as having an annular section 55 designed to slide into the opening 64 for ease of assembly. The annular section 55 has a small opening 57 to receive the end of the corresponding jumper 62. As shown in FIG. 7 three magnetic assemblies 56 t,u and v are attached to the plate 52 at the middle row of openings 64. Each magnetic assembly includes a peg 66 to facilitate engagement with the opening 64 of the plate 52.

Figure 9:
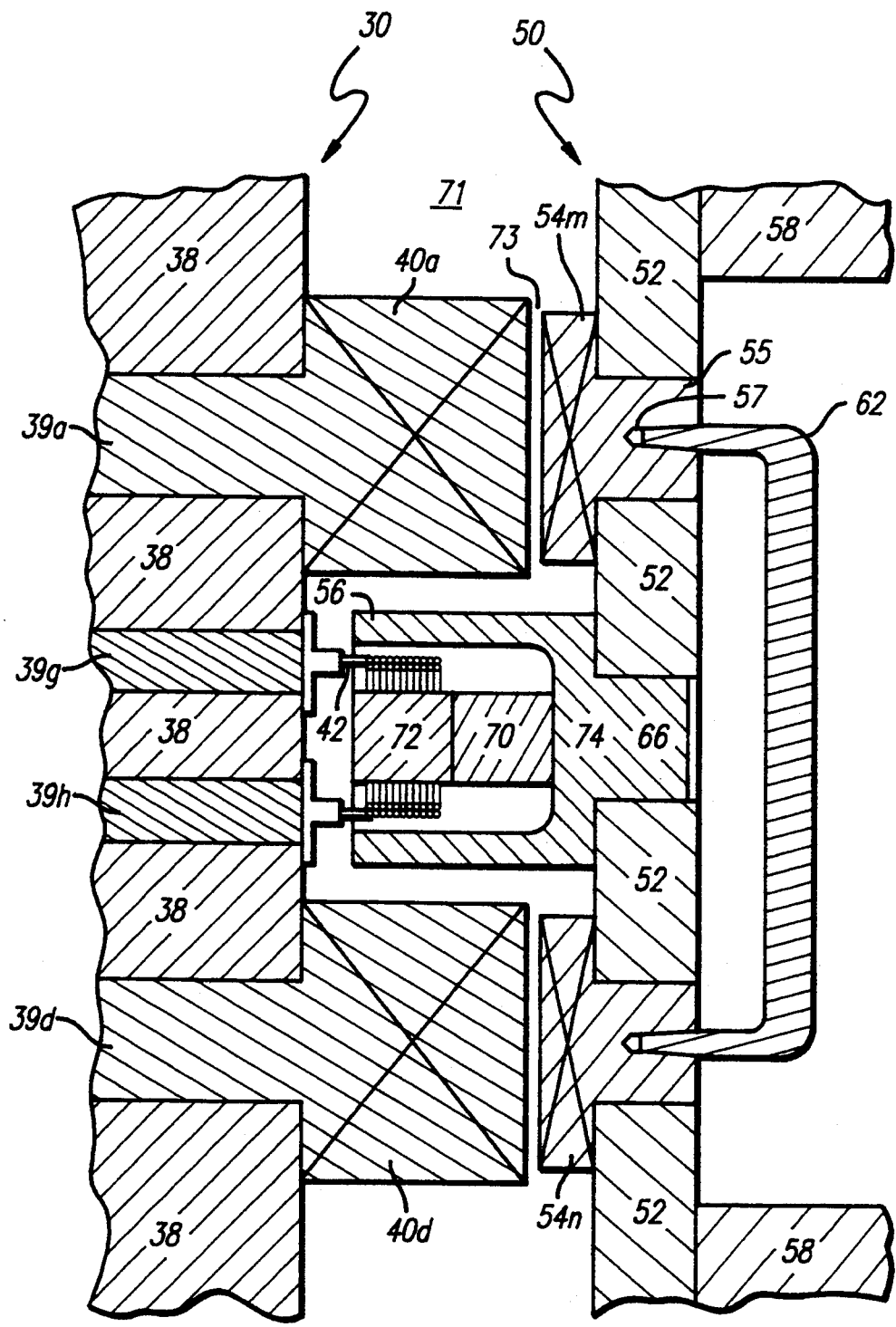
FIG. 9 is a cross-sectional view of the inner plate assembly and outer plate assembly of the Cube of conventional design in close physical relation.

One side of the sensor mass 50 and the corresponding side of the outer assembly 30 are shown in operational engagement in the sectional view of FIG. 9. The outer capacitive contact 40a is shown in close physical relation to the inner capacitive contact 54m. The outer contact 40a has a larger surface area than that of the inner contact 54m to account for manufacturing tolerance and to minimize erroneous interpretation of transverse translation motion as longitudinal translation. This helps to eliminate the cross-axis sensitivity that might exist if the contacts were the same size. Thus, if the outer assembly 38 were to move in a north/south direction for example, the entire face of the contact 54m would continue to see the face of contact 40, no area would be lost. This helps to avoid ambiguity inasmuch as the servos might otherwise detect the loss of surface contact as rotational motion or motion in another direction.

It would be apparent to those skilled in the art that the contacts 40a and 54m provide a capacitive pickoff 73 as shown in FIG. 9. The changes in the spacing of the contacts 40a and 54m are detected by the servos 90 and 92. Capacitive pickoffs and servos are known in the art (See *Measurement Systems Application and Design* by Ernest O. Doebelin, McGraw Hill Publishing Co., revised edition 1975, pp 250–257).

There is no physical contact between the outer assembly 30 and the inner assembly 50. In the preferred embodiment, the volumetric gap 71 between the outer assembly 30 and the inner assembly 50 is filled with oil or other suitable suspension fluid which floats the inner assembly 50 within the outer assembly 30. The fluid provides high damping thus allowing a high servo gain to minimize cross-axis sensitivities and rectifications in shock and vibration environments. It is conceivable to use a gas as the damping medium. The contacts 40 and 54 are bonded or cemented to the surfaces 38 and 52 respectively.

The pin 39a is seen in FIG. 9 as extending through the plate 38 into engagement with the outer contact 40a. The inner contact 54m is connected with contact 54n through jumper 62. Similarly, contact 54n is capacitively coupled with contact 40d which is in turn connected to external electronics via pin 39d. Contacts 40 and 54 thus provide sensing elements.

The magnetic assembly 56 is shown in FIG. 9 below the contact 40a. The magnetic assembly 56 includes a permanent magnet 70, a pole cap 72, a return path 74 and peg 66. The magnet 70 and pole cap 72 are adapted to slide into the center of the coil 42. The coil 42 is energized by current on pins 39g and 39h. The flux generated by the energized coil 42 repels or attracts the permanent magnet assembly 56 depending on the direction of the current. Thus the generated flux tends to maintain the assembly 56 at a desired distance. The current levels within the coils 42 are directly related to the acceleration of the inertial measurement unit 10. The coils 42 are thus selectively energized to suspend the sensor mass 50 relative to the outer assembly 30.

As discussed above, the problem with this conventional Cube design is that when the sensor mass 50 is displaced due to an accelerative force, an increase in direct current in the corresponding coil forces the sensor mass back to the null position. This increase in current causes an increase in the heat generated by that coil. This heat is transferred to the surrounding plate in which it is mounted through conduction, and to the sensor mass through radiation, convection and/or conduction.

The heat transfer causes a thermal gradient through the entire structure from the heat source (the coil) to the heat sink which is generally the outside structure of the Cube. The subsequent temperature increase causes the materials used to construct the outer plates and the sensor mass to expand. This expansion has the effect of changing the pick-off scale factor in that channel as heat slowly propagates throughout the structure. This effect is compounded by the fact that the pickoffs in all other channels are effected by the thermal gradients and subsequent expansion even though there are no accelerations in their respective channels. An output will be produced in every channel because of the heating effect and must be countered in some way. Furthermore, the thermal gradients are very dynamic during typical operation when the linear and angular accelerations shift from channel to channel making it very difficult to separate channel outputs due to heating from those caused by acceleration.

Conventional IMU's control intra-channel thermal effects by converting the DC output signal from analog to digital and compensating for the effects through software. This technique is very effective in conventional IMU's because the individual channels are isolated from each other. The thermal effects of one channel do not effect any other channel because the IMU consists of individual instruments which are physically separated from each other. This is not the case in the Cube since all channels are contained in the same instrument.

With 18 variable heat sources for the Cube, the thermal gradients are generally very dynamic and slow in response to the inputs. The number of combinations of overlapping thermal gradients across each of the 36 pickoffs are nearly unlimited. If the conventional approach is undertaken with respect to the Cube, i.e., compensation through software, the designer is faced with a tradeoff between the number of thermal gradient response scenarios and the response time of the computer, that is, the number of times per second the computer can respond to an acceleration input. Thus, modeling only a few basic scenarios will cause a loss in accuracy due to the pick-off scale factor changes which are not modeled. And a modeling of every scenario require a considerable amount of computer software and so many calculations that the response time of the Cube would be slowed considerably. Further, the development cost and time required to test the scenarios and write the software add to the overall cost of the system, not to mention the opportunity cost of a delayed entry into the market.

The system can be improved somewhat by adding heaters to the Cube so that it operates at a relatively high temperature. This causes the thermal gradients to be less severe. However, the heaters and the temperature sensor require an independent circuit, add cost to the system, and do not eliminate the digital scale factor adjustments.

What is needed is a thermally stable Cube design which would emit the same amount of heat regardless of the current drawn for forced rebalance of the sensor mass. If the heat generated by all 18 coils in the Cube is always the same, the thermal gradients in the structure will reach static conditions after a warm-up period. The structure supporting the pickoffs, as well as the pickoffs themselves, would expand to a static displacement position and thereafter operate at constant geometry. This would insure that there are no changes to the scale factor due to variable heating of the coils so an output in any channel will be purely from acceleration.

Furthermore, the exchange of radiant energy between the inside surface of the outer plates and the outside surface of the sensor mass would have a reciprocity relationship and would therefore be in thermal equilibrium. This would insure that the magnetic field strength of the fixed magnets do not vary due to temperature effects. Further, this would eliminate the need for complicated software to compensate for such scale factor changes and allow the Cube to run at maximum speed.

Thus, there is a need in the art for further improvements in the design of inertial measurement units. Specifically, there is a need for a thermally stable Cube design which would emit the same amount of heat regardless of the current needed for forced rebalance of the sensor mass.

The present invention addresses the need in the art by providing a thermally stable Cube design. The advantageous design of the present invention contemplates the use of a heater coil 124 wound around the same axis as each of the inductive coils 123 of a Cube. The current in the heater coil 124 is controlled by the current in the inductive coil 123 through a control circuit as is discussed more fully below. The heater coil is energized in such a way as to ensure that the heat generated by both coils is constant throughout the required range of operation.

Figure 10:
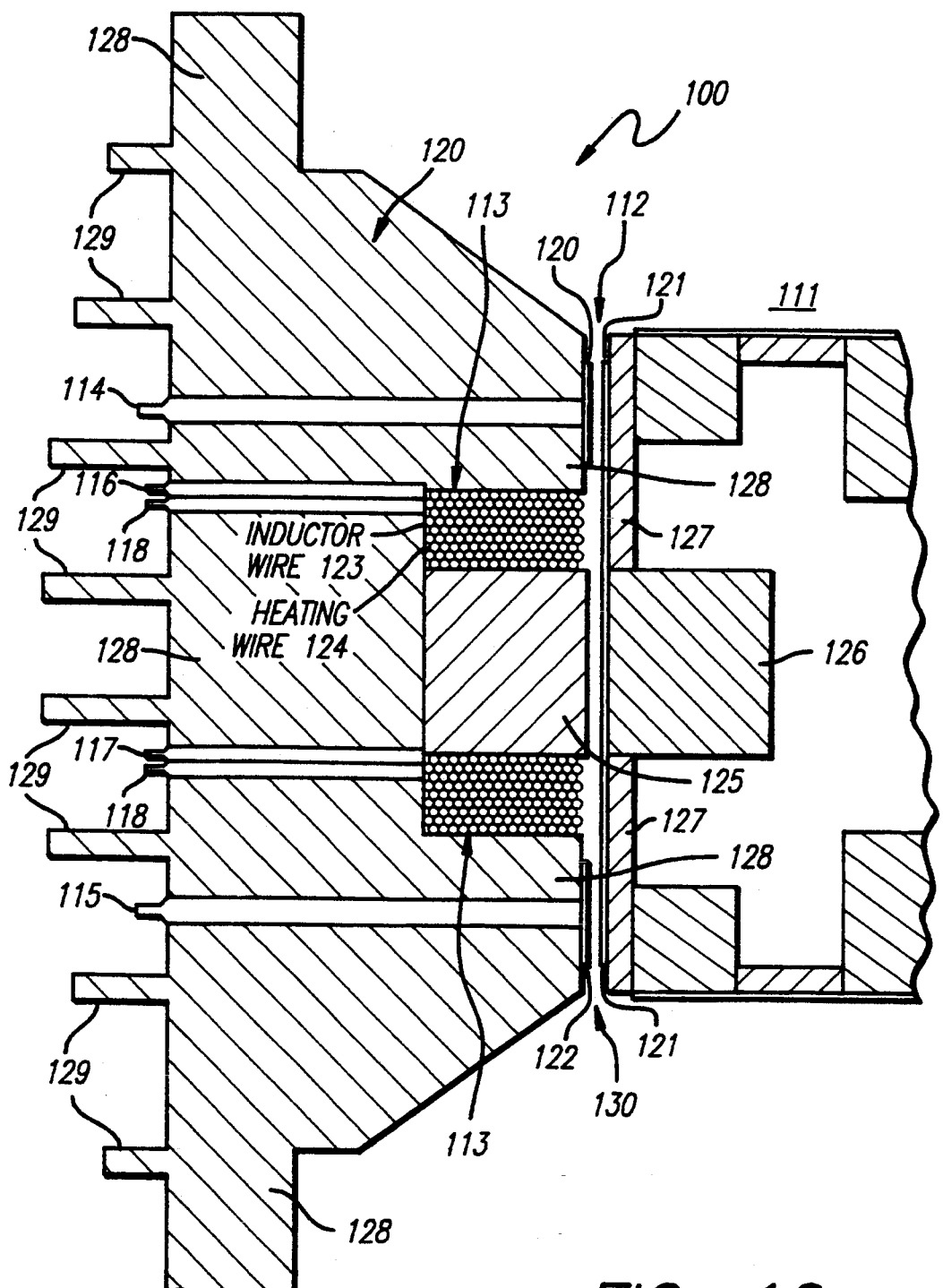
FIG. 10 is a cross-sectional view of the inner plate assembly and outer plate assembly of the Cube of the present invention in close physical relation.

FIG. 10 is a cross-sectional view of the inner plate assembly and outer plate assembly of the Cube of the present invention in close physical relation. The outer plate assembly 110 is shown in close relation to a inner plate assembly (sensor mass) 111. The outer plate assembly 110 includes support structure 128 with extensions 129 which facilitate a heat sink. First and second sensing elements comprised of capacitive plates 112 and 130 respectively are provided. The first plate 112 consists of a first contact 120 on the outer plate assembly 110 and a plate 121 on the inner plate assembly 111. The second plate 130 consists of a second contact 122 on the outer plate assembly 110 and the plate 121 on the inner assembly 111. Pins 114 and 115 provide electrical connection to the first and second plates 120 and 122 respectively.

The outer plate assembly 110 includes a disk 125 on which two lengths of wire are wound on a common axis L to form a solenoid 113. The solenoid 113 comprises two wires bifilarly wound to form an induction coil 123 and a heater coil 124. The heater coil 124 has a dot in the center of the wire to distinguish it from the inductive coil 123. In the illustrative embodiment, the heater coil 124 is wound with an equal number of clockwise and counter-clockwise turns so any current in that coil 124 will create inductive forces which tend to cancel. The solenoid assembly 113 is mounted to the outer plate surface 128.

A magnet 126 is provided on the inner assembly 111 at the axis L as per the design of the conventional Cube. The input lead of inductive coil 123 is connected to pin 116 and output lead to pin 117. The input lead of heater coil 124 is connected to pin 118 and output lead to pin 119. It is assumed that the resistance of pins 116, 117, 118 and 119 is negligible compared to that of the coils 123 and 124, therefore the resistance of the inductive coil 123 is equal to the resistance at the protruding connector of pin 116 and 117. Likewise, the resistance of the heater coil 124 is equal to the resistance at the protruding connector of pin 118 and 119.

Thus, the present invention is a solenoid which is constructed by winding two coils around a common axis. The first coil 123 serves the purpose of producing an inductive force for rebalance of the sensor mass in the same way as in a single wire solenoid. This coil produces heat as a byproduct.

Figure 11:
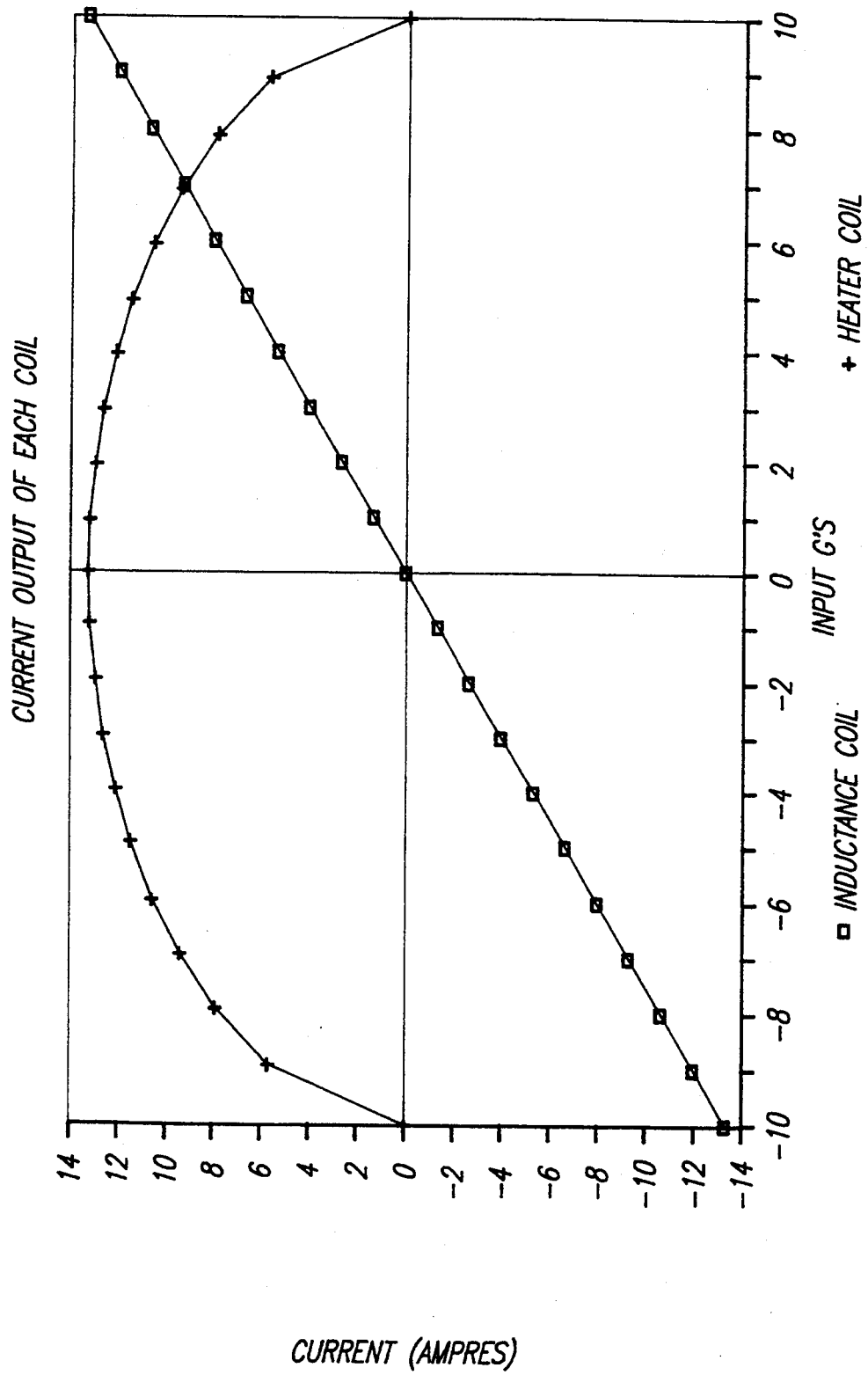
FIG. 11 depicts the current flow in the inductive and heating coils of the design of the present invention.
Figure 12:
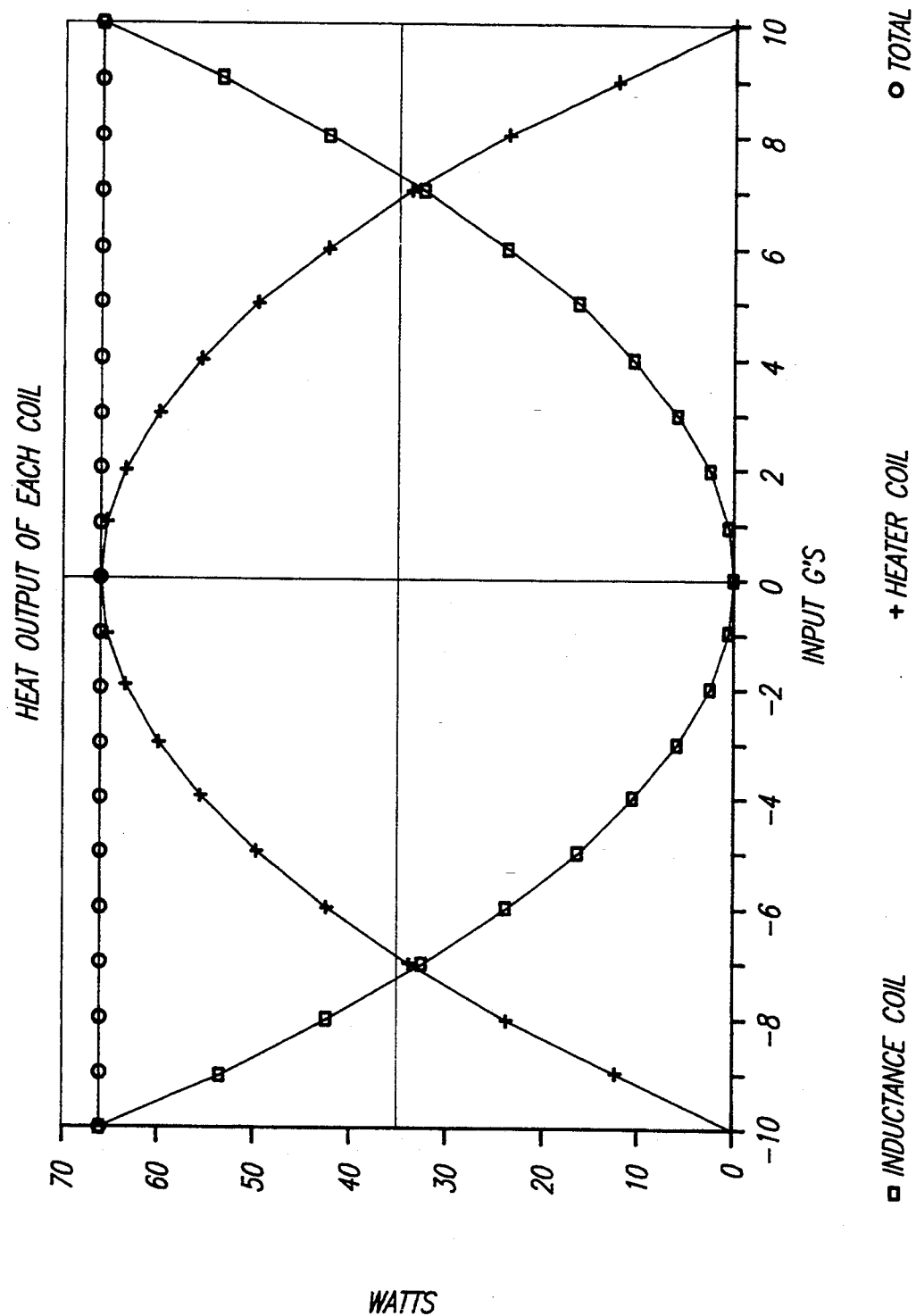
FIG. 12 depicts the heat output by the inductive and heating coils of the present invention.

FIG. 11 depicts the current flow in the inductive and heating coils of the design of the present invention. FIG. 12 depicts the heat output by the inductive and heating coils of the present invention.

The primary function of the heating coil 124 is to produce heat in such a way that the heat generated by both coils is constant. This is expressed mathematically by:

$$C = i_1^2 * R_1 + i_2^2 * R_2 \quad [1]$$

where
  $i_1$ = current in inductive generating coil,
  $R_1$ = resistance of inductive generating coil,
  $i_2$ = current in heat generating coil,
  $R_2$ = resistance of heat generating coil, and
  C = constant power output of both coils.

Figure 13:
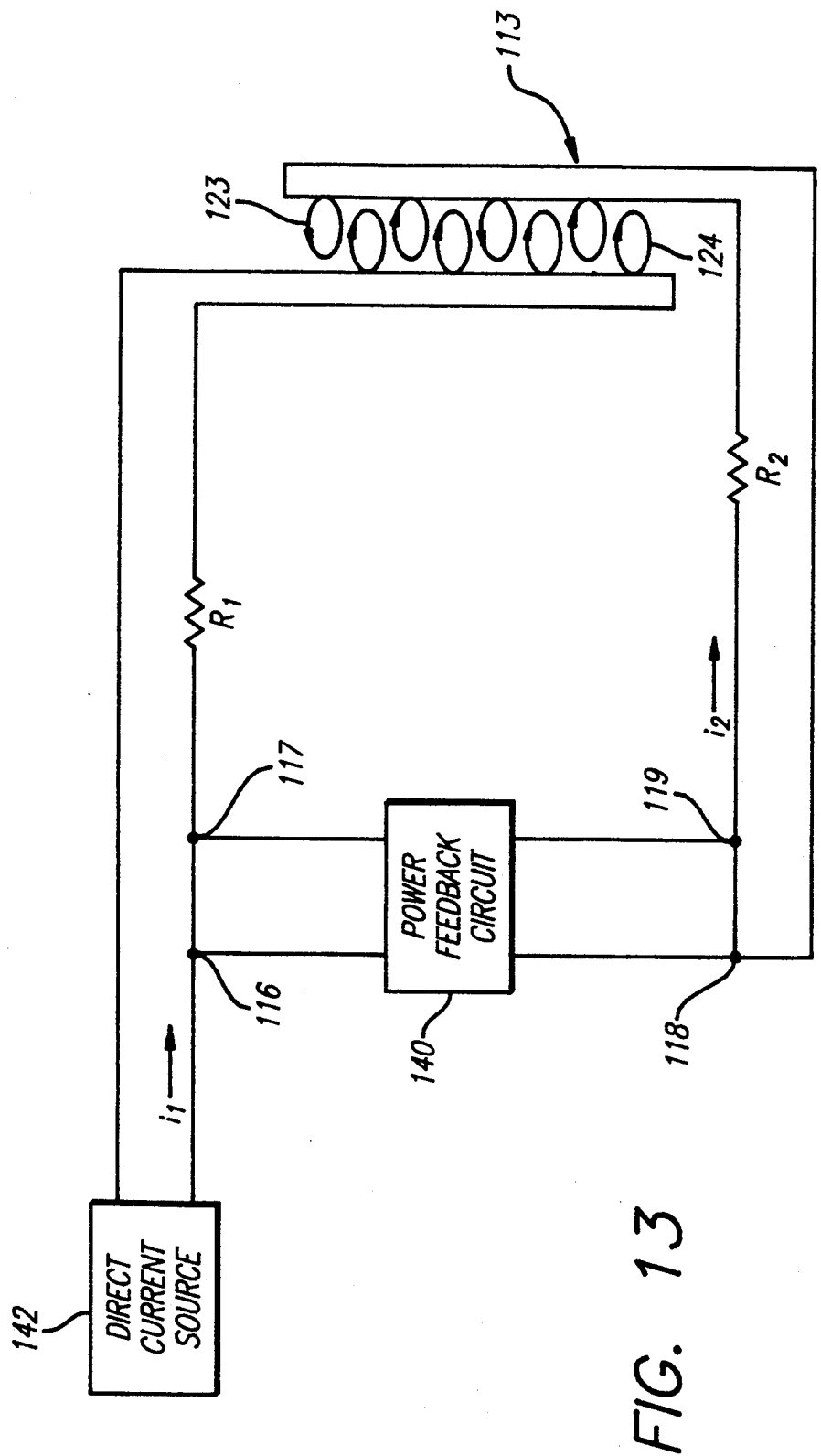
FIG. 13 shows a simplified block diagram of the thermally stable solenoid of the present invention.

As discussed below, the current through the heating coil is controlled by the current through the inductive coil 123 through a bridged power feedback control circuit 140 as shown in FIG. 13 and discussed below. FIG. 13 shows a simplified block diagram of the thermally stable solenoid of the present invention. The circuit includes the inductive and heater coils 123 and 124, respectively, having equivalent resistances $R_1$ and $R_2$ respectively. The power feedback control circuit 140 senses the current in the inductive coil 123 from a conventional current source 142 and provides a current in the heater coil 124 in response thereto which satisfies the equation:

$$i_2 = sqrt(C - (i_1^2 * R_1)/R_2) \quad [2]$$

Equation [2] results from a rearrangement of equation [1].

Table I provides a sample design for a thermally stable linear solenoid constructed in accordance with the present teachings.

| SAMPLE DESIGN FOR THEMRALLY STABLE LINEAR SOLENOID | | | | | | | | | |
|---|---|---|---|---|---|---|---|---|---|
| Wire Diameter = | | 0.00030 meter | | | Resistivity (Silver) = 1.6E-08 ohm-m | | | | |
| Wire Length = | | 2.07645 meter | | | Resistivity (Nickel) = 7.8E-08 ohm-m | | | | |
| Solenoid Height = | | 0.00635 meter | | | Percent Silver = 83% | | | | |
| Solenoid Mean Dia = | | 0.00761 meter | | | Percent Nickel = 17% | | | | |
| Number of Turns = | | 21 | | | Scale Factor = 0.50 | | | | |
| Number of Layers = | | 4 | | | | | | | |
| G's | Input Volt | Silver Ohms | Silver Current | Silver Watts | Nickel ohms | Nickel Watts | Nickel Current | Colt Flux | Total Watt |
| −10 | −5.0 | 0.38 | −13.21 | 66.05 | 0.38 | 0.00 | 0.00 | −0.188 | 66.05 |
| −9 | −4.5 | 0.38 | −11.89 | 53.50 | 0.38 | 12.55 | 5.76 | −0.170 | 66.05 |
| −8 | −4.0 | 0.38 | −10.57 | 42.27 | 0.38 | 23.78 | 7.93 | −0.151 | 66.05 |
| −7 | −3.5 | 0.38 | −9.25 | 32.36 | 0.38 | 33.69 | 9.44 | −0.132 | 66.05 |
| −6 | −3.0 | 0.38 | −7.93 | 23.78 | 0.38 | 42.27 | 10.58 | −0.113 | 66.05 |
| −5 | −2.5 | 0.38 | −6.61 | 16.51 | 0.38 | 49.54 | 11.45 | −0.094 | 66.05 |
| −4 | −2.0 | 0.38 | −5.28 | 10.57 | 0.38 | 55.48 | 12.12 | −0.075 | 66.05 |
| −3 | −1.5 | 0.38 | −3.96 | 5.94 | 0.38 | 60.11 | 12.61 | −0.057 | 66.05 |
| −2 | −1.0 | 0.38 | −2.64 | 2.64 | 0.38 | 63.41 | 12.95 | −0.038 | 66.05 |
| −1 | −0.5 | 0.38 | −1.32 | 0.66 | 0.38 | 65.39 | 13.15 | −0.019 | 66.05 |
| 0 | 0.0 | 0.38 | 0.00 | 0.00 | 0.38 | 66.05 | 13.22 | 0.000 | 66.05 |
| 1 | 0.5 | 0.38 | 1.32 | 0.66 | 0.38 | 65.39 | 13.15 | 0.019 | 66.05 |
| 2 | 1.0 | 0.38 | 2.64 | 2.64 | 0.38 | 63.41 | 12.95 | 0.038 | 66.05 |
| 3 | 1.5 | 0.38 | 3.96 | 5.94 | 0.38 | 60.11 | 12.61 | 0.057 | 66.05 |
| 4 | 2.0 | 0.38 | 5.28 | 10.57 | 0.38 | 55.48 | 12.12 | 0.075 | 66.05 |
| 5 | 2.5 | 0.38 | 6.61 | 16.51 | 0.38 | 49.54 | 11.45 | 0.094 | 66.05 |
| 6 | 3.0 | 0.38 | 7.93 | 23.78 | 0.38 | 42.27 | 10.58 | 0.113 | 66.05 |
| 7 | 3.5 | 0.38 | 9.25 | 32.36 | 0.38 | 33.69 | 9.44 | 0.132 | 66.05 |
| 8 | 4.0 | 0.38 | 10.57 | 42.27 | 0.38 | 23.78 | 7.93 | 0.151 | 66.05 |
| 9 | 4.5 | 0.38 | 11.89 | 53.50 | 0.38 | 12.55 | 5.76 | 0.170 | 66.05 |
| 10 | 5.0 | 0.38 | 13.21 | 66.05 | 0.38 | 0.00 | 0.00 | 0.188 | 66.05 |

An example of the current output of the heater coil is provided in Column 8 of Table I and graphically in FIG. 11. The heater coil 124 produces heat as shown in Table I, Column 7 and graphically in FIG. 12. Table I, Column 11 and FIG. 12 also show that the heat generated by both coils is constant throughout the range of operation, in this case 66.05 watts.

The constant power equation can also be expressed in terms of voltage:

$$C = V_1^2/R_1 + V_2^2/R_2 \quad [3]$$

where
  $V_1$ = voltage across inductive generating coil,
  $R_1$ = resistance of inductive generating coil,
  $V_2$ = voltage across heat generating coil,
  $R_2$ = resistance of heat generating coil, and
  C = constant power output of both coils Solving for the voltage in the heater coil yields:

$$V_2 = sqrt((R_2 * C) - ((R_2/R_1) * V_1^2)) \quad [4]$$

Figure 14:
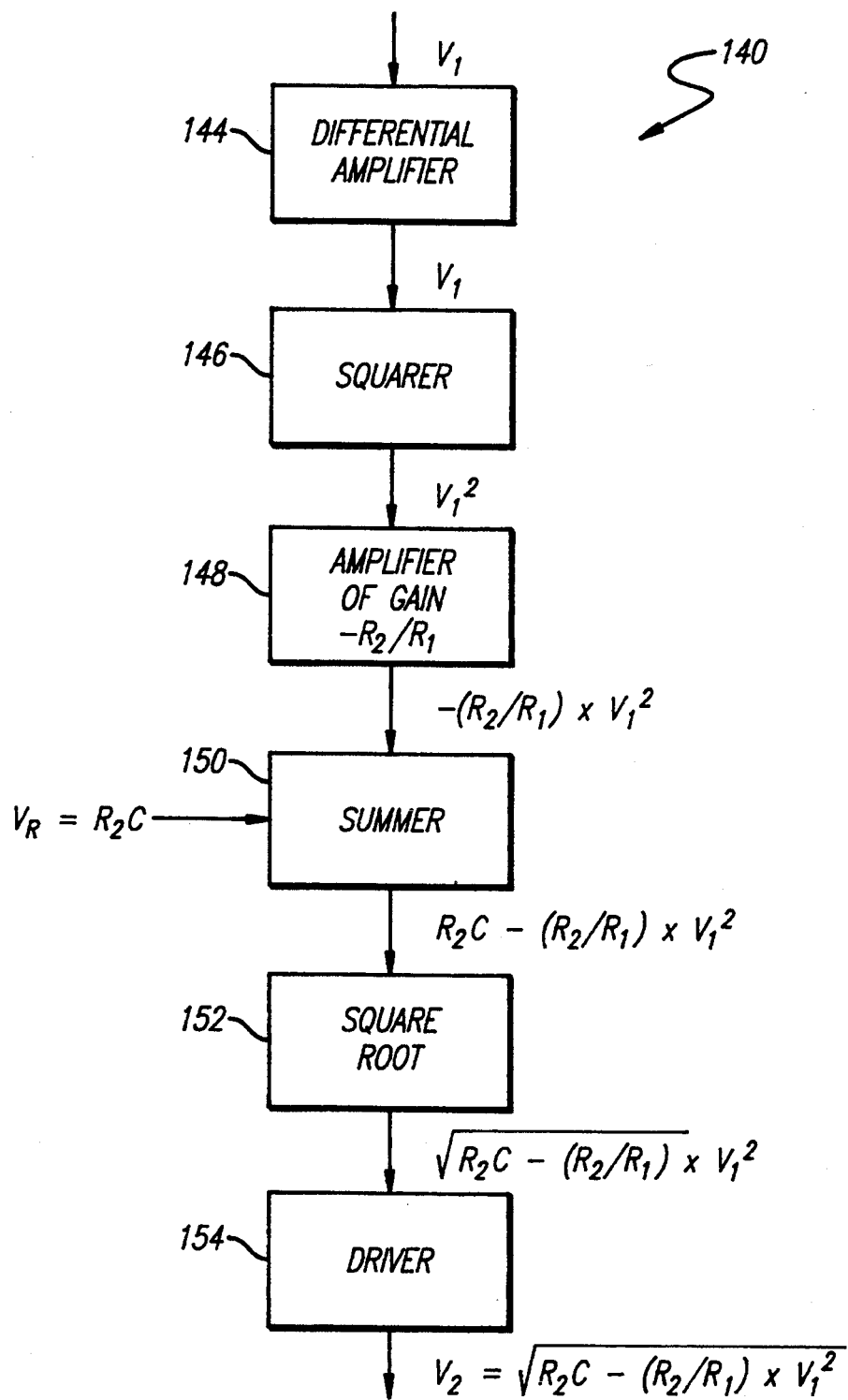
FIG. 14 is a block diagram of the power control circuit of the thermally stable solenoid of the present invention.

FIG. 14 is a block diagram of the power control circuit of the thermally stable solenoid of the present invention. The block diagram of FIG. 14 shows an illustrative embodiment of a circuit which will produce a voltage which will satisfy equation [4]. The power control circuit 140 includes a differential amplifier 144, a squarer 146, an amplifier of gain $R_2/R_1$, 148 a summer 150, a square root operator 152 and a driver 154. The voltage $V_R$ is provided by a separate independent DC voltage source.

Figure 15:
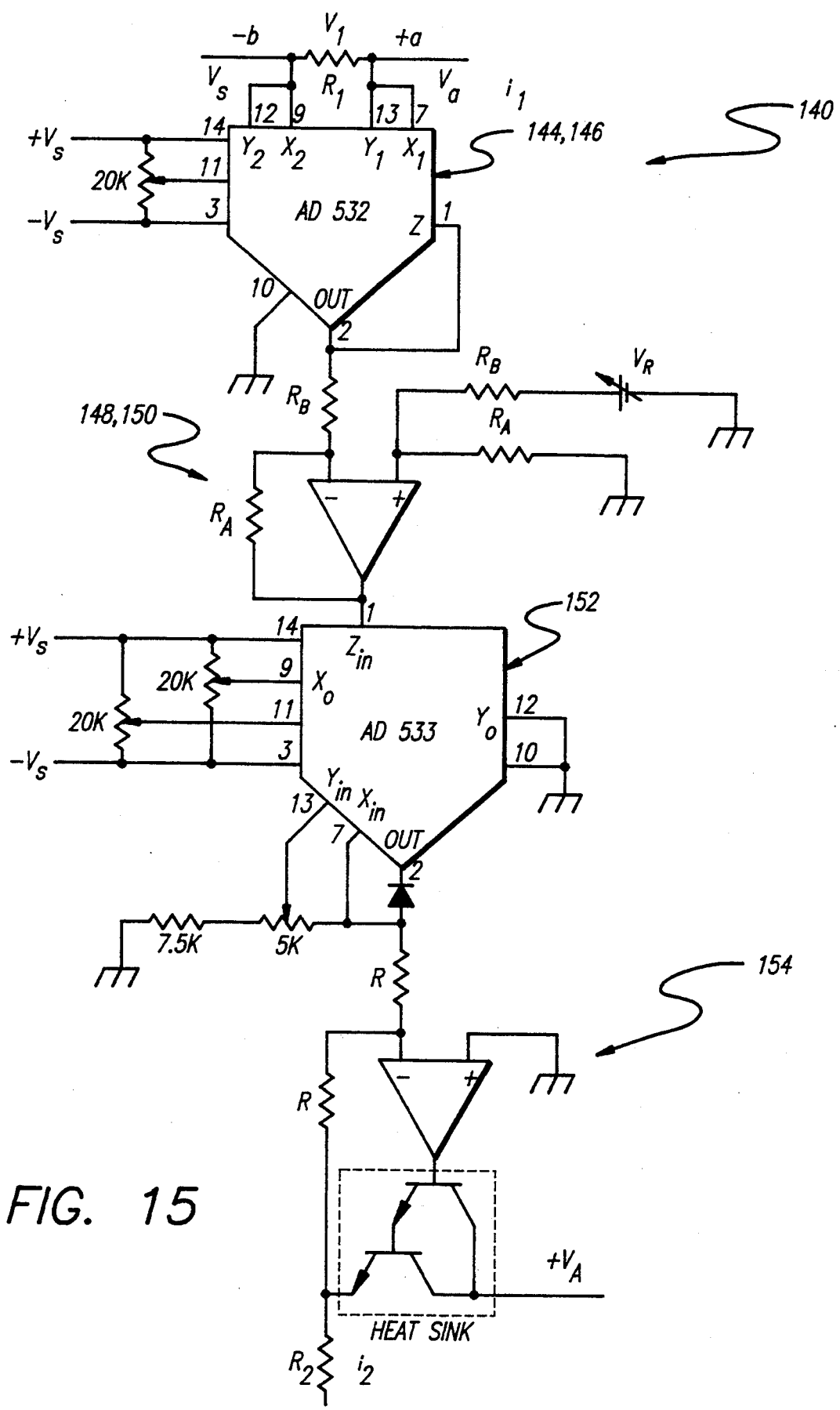
FIG. 15 is a schematic diagram of the power control circuit of the thermally stable solenoid of the present invention.
Figure 16:
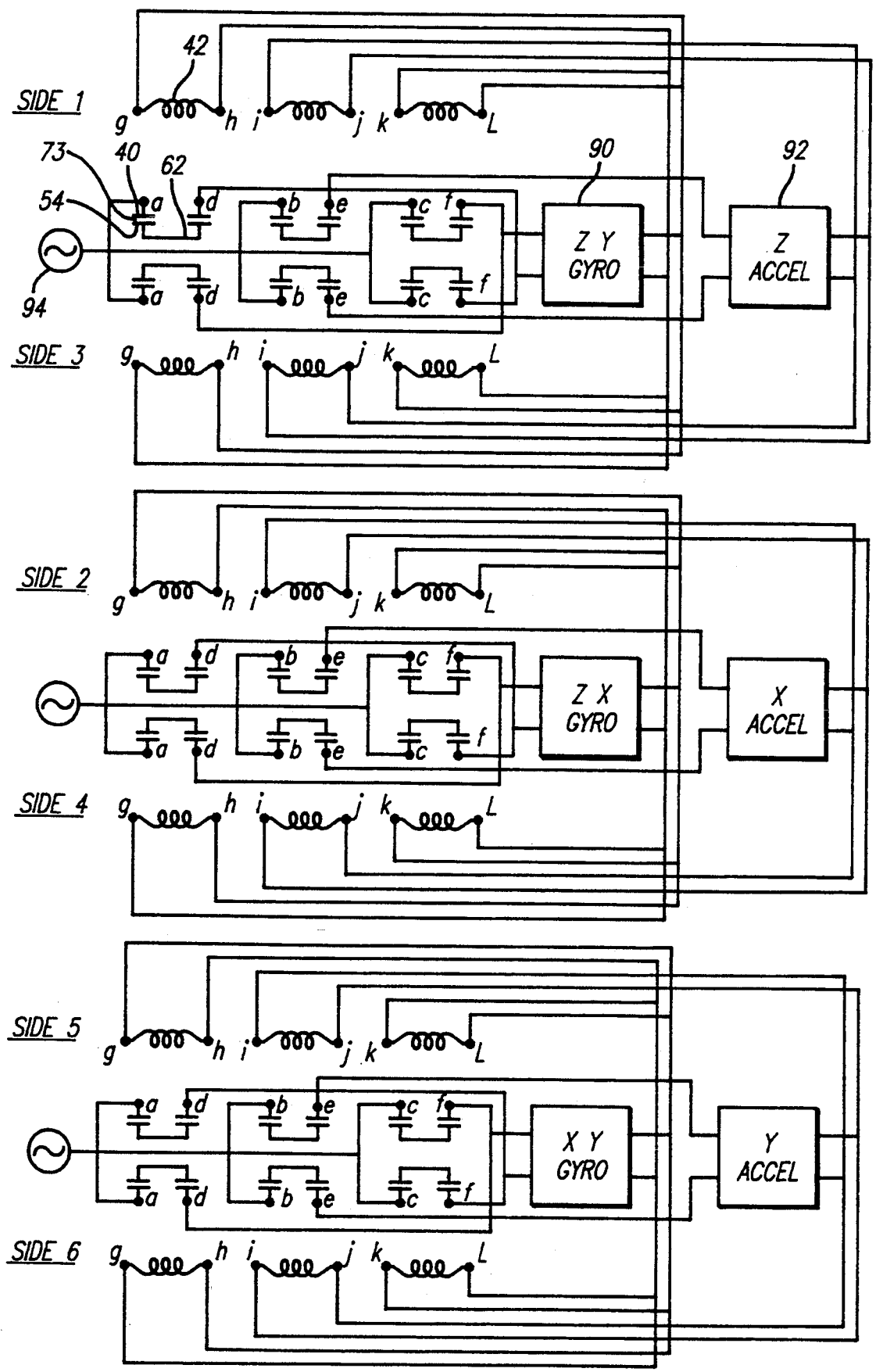
FIG. 16 is a schematic diagram of the combination three axis accelerometer and three axis angular turning rate detector of the Cube of conventional design.

FIG. 15 is a schematic diagram of an illustrative implementation of the power control circuit 140 which will produce the proper voltage and current in the heater coil 124 to satisfy equation [4]. In FIG. 15, the following values are used:

$R_1 = 0.38$ ohms
$R_2 = 0.38$ ohms
$R_A = 1$ k ohms
$R_B = 1$ k ohms
$V_A = 2.5$ volts
$C = 66$ watts
AD 532 sold by Analog Devices
AD 533 sold by Analog Devices The combination three axis accelerometer and three axis angular turning rate detector of the Cube of conventional design is shown schematically in FIG. 16. It includes a plurality of coils 42, capacitive pickoffs 73 and servo-control circuits 90 and 92. Note that one gyro servo 90 and one accelerometer 92 is provided for each axis. Thus a total of six servos are utilized in the Cube. It is understood that the servos could be combined into a single system within the scope of the Cube.

While sides 1 and 3 are described below, it is understood that the same applies to the other corresponding opposing sides 2 and 4 and 5 and 6. Thus, for side 1, the plate 38 has coils 42gh and 42kl electrically connected to the gyro-servo 90 as the coils gh and kl on each interior surface of the outer assembly 30 are used to maintain the angular attitude of the sensor mass 50. The coils 42ij on each side are connected to the accelerometer servo 92. Inputs to the servos 90 and 92 are received from the capacitive pickoffs 73 which have one side connected to a sinusoidal voltage source 94. Thus the d contact and the f contact on each plate 38 are connected to the gyro-servo 90 and the e contact is connected to the accelerometer-servo 92.

Appropriate servo-control circuits would be utilized in the present invention as well.

OPERATION

The operation of the Cube of conventional design is provided here as a basis for understanding the operation of the present invention.

Accelerometer:

Assuming for the purpose of explanation that the Cube is assembled and energized, the sensor mass 50 of FIG. 3 is electromagnetically suspended within the outer assembly 30. Using the x,y,z coordinate system provided, movement of the outer assembly 30 in the z direction causes side 3 of the sensor mass 50 to move closer to side 3 of the outer assembly 30. Simultaneously, side 1 of the sensor mass 50 moves away from side 1 of the outer assembly 30. The capacitive pickoffs 73 on side 3 experience an increase in capacitance resulting from a decrease in the distance between the contacts 40 on the outer plate 38 and 54 on the inner plate 52. This change in capacitance causes a corresponding change in the input impedance at the accelerometer. As discussed more fully below, the accelerometer servo 92 sees a net change in impedance at contacts 40b and e. The accelerometer servo 92 will see no change in the impedance at the gyro contacts 40a and d and 40c and f on sides 1 and 3.

The accelerometer servo 92 will compare the impedance at pins 40b and 40e on side 3 to that at pins 40b and 40e on side 1. If any difference is detected between these impedances the servo 92 will cause current flow through coils 42 at pins 42i and 42j of side 1 and side 3. The field generated by current flow through the center coil 42 on side 3 will push the sensor mass 50 while the field generated by current flow through the center coil 42 on side 1 will pull the sensor mass 50. The amount of current flow is directly proportional to the amount of acceleration. Thus the sensor mass 50 will remain centered between the plates 38 of sides 1 and 3. Similarly, motion in the x and y directions yields a similar reaction in the corresponding components of sides 2 and 4 and 5 and 6 respectively thus providing a three axis accelerometer.

The zy gyro servo 90 is sensitive to movement in the zy plane and sees no voltage difference at the cross-coupled contacts 40d of side 1 and 40f of side 3 compared to that at contacts 40d of side 3 and 40f of side 1 in response to z axis movement. In short, no difference is noted in response to the z axis movement because the contacts are cross coupled. The zy gyro 90 sees the same voltage change on its side 1 input and its side 3 input. Thus the movement is not interpreted as rotation. Finally, the contacts on sides 2, 4, 5 and 6 do not move closer together or farther apart with z axis translation, the corresponding gyro and accelerometer servos 90 and 92 do not see any net change or imbalance in input voltages.

One of ordinary skill in the art will see that the same analysis applies to translations in the x and y axes and therefore that a three-axis accelerometer is provided with minimal cross-axis sensitivity.

Angular Turning Rate Detector:

Assuming once again that the Cube is assembled and energized such that the sensor mass 50 of FIG. 3 is suspended within the outer assembly 30. Assume further that the outer assembly 30 experiences a counter-clockwise rotation or angular turn about the x axis. Contacts 40a and d of side 3 and contacts 40c and f of side 1 of the outer plate 38 move closer to the corresponding contacts on the inner plate 52 of the sensor mass 50. Simultaneously, contacts 40c and f of side 3 move toward the sensor mass 50 and 40a and d of side 1 move away from the sensor mass 50. The zy gyro servo 90 will compare the resulting impedance changes and rotate the sensor mass 50 in a counter-clockwise direction, by energizing the four outside coils 42gh and kl on sides 1 and 3. That is, the zy gyro servo 90 will cause current to flow such that the coils 42gh of side 1 and 42kl of side 3 will generate a force of attraction toward the corresponding permanent magnets 70 of the sensor mass 50. Likewise, the gyro servo 90 will generate a pushing force with coils 42kl of side 1 and 42gh of side 3.

The z axis accelerometer servo 92 will not detect any translational motion as a result of the rotational motion because 1) there will be little if any change in the proximity of the contacts on either side, thus little change in impedance and 2) any such change in the impedance associated with the accelerometer pickoffs of side 1 via contacts 40b and e will be matched by corresponding changes in that of the accelerometer pickoffs of side 3 and vice versa. Thus the z axis accelerometer servo 92 of FIG. 10 sees a balanced voltage on both sides of the sensor mass 50. Similarly, the gyro and accelerometer servos 90 and 92 servicing sides 2 and 4 will not detect any motion in response to the rotation about the x axis because the contacts of the pickoffs associated with sides 2 and 4 do not undergo any relative movement in response to rotation about the x axis. That is the contacts do not move any closer together or farther apart in response to such rotation.

Servos of sides 5 and 6 do not react but for a different reason. When the outer assembly rotates around the x axis counter-clockwise the sensor mass initially experiences relative clockwise rotation. Contacts 40a, b and c on sides 5 and 6 move farther away from the corresponding contacts on the sensor mass 50 while contacts 40d, e and f move closer to the corresponding contacts on the sensor mass. For example, referring now to FIG. 10, contact 40d on one side is cross-coupled to contact 40f on the other and vice versa. The gyro servo 90 will see the same voltage on each side and detect no change in angular position. The same is true for the corresponding accelerometer servos 92.

One of ordinary skill in the art will see that a corresponding angular turn about the other axes causes a corresponding set of reactions such that the Cube provides a three axis angular rate detector or gyroscope with minimal cross-axis sensitivity.

The operation of the Cube of the present design is identical to that of the conventional Cube with the following exceptions. Assuming that the Cube is energized, the sensor mass 111 of FIG. 10 is electromagnetically suspended within the outer assembly 110. (See the above referenced Morrison patent.) An AC signal is passed through lead 114, across capacitive pickoffs 112 and 130, and out through lead 115. When the Cube is in a zero G environment, the input signal is equal to the output signal across leads 114 and 115, and no current in coil 123 is present. (There actually is because the Cube hasn't warmed up yet and the pickoffs have not been zeroed, but for illustrative purposes, assume it is zero for now). This causes the current in coil 124 to be energized by leads 118 and 119 through feedback control loop 140. This current will cause no net inductive force to be generated since this coil has an equal number of clockwise and counter-clockwise turns as previously stated. The heat generated by heat source 113 flows through the ferrous material 125 and ceramic heat conducting material 128 to heat sink 129. Furthermore, the exchange of heat from heat source 113 to sensor mass structure 111 is in equilibrium with the exchange of heat between sensor mass structure 111 and outer plate structure 110. This heating causes the outer plate material 128, the inner plate structure 127, and the capacitive pickoffs 120, 121 and 122 to expand. After some time has passed (the measured warm-up time), the heat from solenoid 113 will have propagated through the outer plate structure 110 and sensor mass 111. The result is a thermal gradient between heat source solenoid 113 and heat sink 129 which is in a constant temperature environment. The outer plate pickoffs 120 and 122 have moved closer to sensor mass pick-off 121 because of the expansion of outer plate 110 and sensor mass 111 thus making the gap 112 and 130 between the two smaller than it was originally. (This is the actual gap which cause zero current flow in coil 123).

Using the coordinate system provided, movement of the outer assembly in the x direction causes outer plate 110 to move closer to sensor mass 111, see FIG. 10. The capacitive pickoffs experience an increase in capacitance resulting from a decrease in the distance between the contacts 120, 121 and 121, 122. The accelerometer servo 92 of FIG. 16 will compare the impedance at pins 114 and 115 to the impedance of corresponding pins on the opposite side of the sensor mass. If any difference is detected between these impedance, the servo will cause current flow through coil 123 at pins 116 and 117. The field generated by current flow through the coil 123 will cause an inductive force which will push the sensor mass 111 while a corresponding coil on the opposite side of the sensor mass will pull the coil back to the null position. The amount of current flow is a function of the acceleration and is the measured output of the accelerometer.

The voltage across pins 116 and 117 are used as a bridge to a feedback control loop circuit 140 to generate a voltage across pins 118 and 119 which causes the current flowing through coil 124 to be less than it was at zero G by the amount dictated by the feedback control loop circuit 140. The heat generated by heat source 123 is exactly equal to the loss in heat from coil 124. Therefore, the heat generated by coil 123 plus the heat generated by coil 124 at the measured G force is exactly the same as the combination of heat generated by coils 123 and 124 at zero G. It is also assumed that since the two coils are intertwined, the heat generated by the individual coils 123 and 124 will appear as a single heat source solenoid to the rest of the structure. The thermal gradient established after the required warm-up time does not change, therefore, any change in the distance between capacitive pick-off gaps 112 and 130 will be due to pure acceleration in that particular channel throughout the entire Cube.

Thus the present invention has been described with reference to a particular embodiment in connection with particular applications. Those having ordinary skill in the art and access to the teachings of the present invention will recognize additional modifications and applications within the scope thereof. For example, the inductive force in the heater coil 124 can be any variation of additive, subtractive or zero with respect to the first coil.

In the case where a linear output in the solenoid is desired, the heat generating coil is wound with an equal number of clockwise and counterclockwise turns so the inductive forces generated would tend to cancel producing no inductive force. Therefore, the net inductive force of both coils in the solenoid is simply the inductive force in the first coil which is usually linear.

If a nonlinear output is desired in the solenoid, then the number of clockwise turns in the second coil is not equal to the number of counter-clockwise turns (or vice versa) so that the inductive force in the second coil can be added to or subtracted from the inductive force in the first coil.

Such a design may be desirable in Cube applications. The design of the conventional Cube requires the elimination of the return paths and pole caps to maximize the power to weight ratio needed to suspend the sensor mass without a fluid. The resulting design produces a non-linear scale factor which results in nonuniform sensitivity throughout the range of operations. This means the instrument is more sensitive when measuring low G forces than high G forces. If the non-linear inductive force in the second coil is added to the linear inductive force in the first coil, the resulting non-linear inductive force curve can be designed to match the non-linear inductive force curve of the fixed magnet resulting in a linear scale factor. Even if the match is not exact, making the scale factor more linear may be an improvement.

In the case of the heater coil's inductive force being added to or subtracted from the inductor coil, it may also be advantageous the add their currents before the analog to digital conversion is made. This will insure the current is a function of the rebalance force.

These examples are not exhaustive but merely intended to provide some insight into the possibilities provided by the present invention to one of ordinary skill in the art. Such modifications and applications are contemplated by the appended Claims,

What is claimed is:

1. A thermally stable solenoid comprising:
    first means for providing an inductive force, said first means including an inductive coil wound around an axis;
    second means for selectively providing heat to said first means, said second means including a heating coil wound around said axis; and
    means for activating said heating coil in response to the activation of said inductive coil to provide heat whereby the heat generated by said activated inductive coil and said activated heating coil is substantially constant throughout the range of operation of said inductive coil.

2. The invention of claim 1 wherein said means for activating said heating coil includes means for providing a current in the heating coil which is related to the current in the inductive coil by the following equation $$i_2 = sqrt(C - (i_1^2 * R_1)/R_2) \qquad [2]$$

where
   $i_1$ = current in the inductive coil,
   $R_1$ = resistance of the inductive coil,
   $i_2$ = current in the heating coil,
   $R_2$ = resistance of heating coil, and
   $C$ = is a constant representing the power output of both coils.

3. The invention of claim 1 wherein said heating coil includes an equal number of clockwise and counterclockwise turns to provide a minimal net inductive force.

* * * * *